(12) United States Patent
Scobie et al.

(10) Patent No.: US 10,002,057 B2
(45) Date of Patent: Jun. 19, 2018

(54) METHOD AND APPARATUS FOR MANAGING MISMATCHES WITHIN A MULTI-THREADED LOCKSTEP PROCESSING SYSTEM

(71) Applicant: FREESCALE SEMICONDUCTOR, INC., Austin, TX (US)

(72) Inventors: James Andrew Collier Scobie, Helensburgh (GB); Alan R. Duncan, Ayr (GB); Alison Young, Clarkston (GB); Alistair P. Robertson, Glasgow (GB)

(73) Assignee: NXP USA, Inc., Austin, TX (US)

( * ) Notice: Subject to any disclaimer, the term of this patent is extended or adjusted under 35 U.S.C. 154(b) by 173 days.

(21) Appl. No.: 15/172,704

(22) Filed: Jun. 3, 2016

(65) Prior Publication Data
US 2017/0351577 A1    Dec. 7, 2017

(51) Int. Cl.
*G06F 11/00* (2006.01)
*G06F 11/16* (2006.01)

(52) U.S. Cl.
CPC ........ *G06F 11/165* (2013.01); *G06F 11/1641* (2013.01)

(58) Field of Classification Search
CPC .................................................. G06F 11/165
See application file for complete search history.

(56) References Cited

U.S. PATENT DOCUMENTS

| | | | |
|---|---|---|---|
| 5,915,082 A | 6/1999 | Marshall et al. | |
| 6,615,366 B1 * | 9/2003 | Grochowski | G06F 9/30076 712/1 |
| 6,625,749 B1 | 9/2003 | Quach | |
| 7,216,223 B2 * | 5/2007 | Michaelis | G06F 9/44505 713/1 |
| 7,716,521 B1 * | 5/2010 | Donahue | G06F 9/3851 714/11 |
| 7,957,948 B2 * | 6/2011 | Zink | G06F 11/3419 702/176 |
| 8,006,075 B2 * | 8/2011 | Luttrell | G06F 9/3824 712/216 |

(Continued)

FOREIGN PATENT DOCUMENTS

| | | |
|---|---|---|
| WO | 2006116257 A2 | 11/2006 |
| WO | 2008119756 A1 | 10/2008 |
| WO | 2014125338 A1 | 8/2014 |

*Primary Examiner* — Christopher S McCarthy

(57) ABSTRACT

A processing system comprising a first processing domain and a second processing domain. Each of the first processing domain and the second processing domain comprises a multi-threaded processor core arranged to output a set of internal state signals representative of current states of internal components of the respective processor core. The processing system further comprises a supervisor component arranged to receive the sets of internal state signals output by the processor cores of the first and second processing domains, compare internal state signals output by the processor core of the first processing domain to corresponding internal state signals output by the processor core of the second processing domain, and upon detection of a mismatch between compared internal state signals to initiate a reset of a thread under the execution of which the detected mismatch of internal state signals occurred.

16 Claims, 7 Drawing Sheets

(56) References Cited

U.S. PATENT DOCUMENTS

| | | | |
|---|---|---|---|
| 8,082,425 B2 | 12/2011 | Sudhakar et al. | |
| 8,090,984 B2 | 1/2012 | Moyer et al. | |
| 9,063,907 B2 | 6/2015 | Yamada et al. | |
| 9,710,273 B2 * | 7/2017 | Lewis | G06F 9/30145 |
| 9,829,965 B2 * | 11/2017 | Hum | G06F 1/3203 |
| 2006/0245264 A1 | 11/2006 | Barr et al. | |
| 2009/0182991 A1 * | 7/2009 | Quach | G06F 9/30189 |
| | | | 712/222 |
| 2010/0146335 A1 | 6/2010 | Moyer et al. | |
| 2012/0130680 A1 * | 5/2012 | Zink | G06F 11/3442 |
| | | | 702/186 |
| 2015/0039753 A1 * | 2/2015 | Zink | G06F 11/3442 |
| | | | 709/224 |
| 2016/0092331 A1 * | 3/2016 | Cain, III | G06F 11/1608 |
| | | | 714/37 |

* cited by examiner

METHOD AND APPARATUS FOR MANAGING MISMATCHES WITHIN A MULTI-THREADED LOCKSTEP PROCESSING SYSTEM

FIELD OF THE INVENTION

This invention relates to a method and apparatus for managing mismatches within a multi-threaded lockstep processing system, and in particular to a processing system comprising a supervisor component for managing such mismatches and a method therefor.

BACKGROUND OF THE INVENTION

In the industries such as the automotive industry, there is a trend away from 'Fail Safe' systems, in which a system is put into a safe (restricted) mode when a fault is detected, towards 'Fault Tolerant' systems that enable less restricted operation upon a fault occurring. To minimize application software complexity within electronic control units etc., lockstep cores are typically requested by automotive companies, whereby the same set of operations is run at the same time on multiple processor cores in parallel to provide fault detection during operation.

Power/performance ratio requirements are driving implementations towards the use of multi-threaded cores in order to deliver the required performance increases at acceptable power levels. However, the detection of a fault within one element of a multi-threaded lockstep core will result in a lock step miss-match across all threads running on the lockstep-cores. With conventional lockstep implementations, this will result in fault handling being implemented across all threads running on the lockstep system, for example all threads being stopped. This outcome conflicts with the desired move towards fault tolerant systems that support higher levels of functional availability during fault conditions.

SUMMARY OF THE INVENTION

The present invention provides a processing system, an integrated circuit device and a method of managing mismatches within a multi-threaded lockstep processing system as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

According to some example embodiments of the present invention there are provided a method and apparatus for managing mismatches within a multi-threaded lockstep processing system. Pairs of internal state signals output by lockstep processor cores are compared to detect mismatches between internal states of the lockstep processor cores. In this manner, mismatches between the lockstep processors can be detected on an internal component basis (as opposed to simply on a processing core basis), enabling faults to be related to individual internal resources and threads. As such, when a mismatch between internal processor states is detected, only the thread running on each of the processor cores under the execution of which the detected mismatch of internal state signals occurred need be reset, and not the processor cores as a whole. Advantageously, this enables other (non-faulty) threads to remain running, increasing the availability of functionality provided by processing system, even when a faulty thread is detected.

Figure 1:
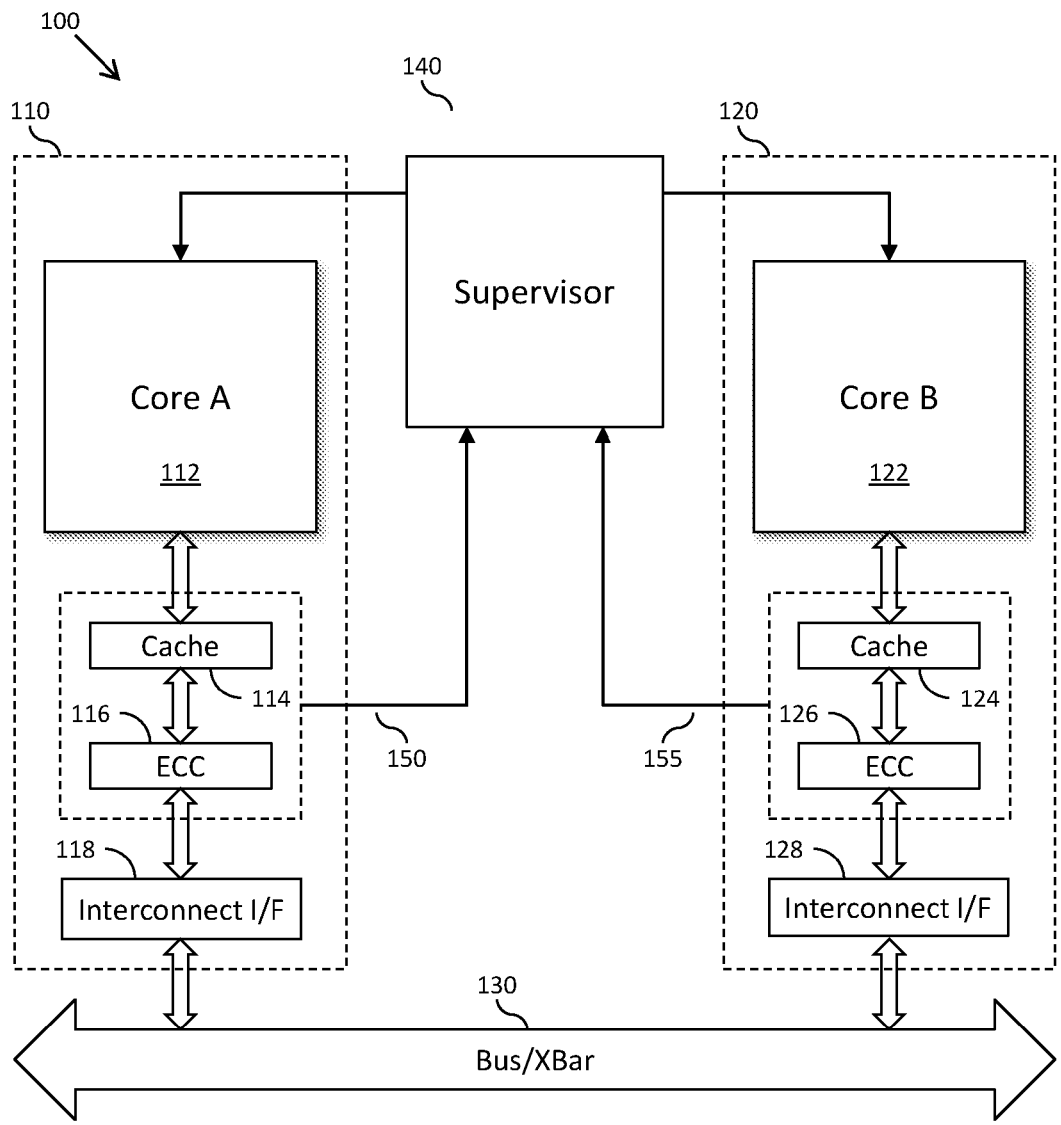
FIG. 1 illustrates a simplified block diagram of a conventional lockstep architecture.

FIG. 1 illustrates a simplified block diagram of a conventional lockstep architecture 100 consisting of a first processing domain 110 and a second processing domain 120. Each of the processing domains 110, 120 includes one or more processor cores 112, 122 coupled to one or more interconnect components 130 such as a system bus, crossbar switch, or the like. In the illustrated architecture of FIG. 1, each processor core 112, 122 is coupled to the interconnect component 130 via a cache memory component 114, 124, error correcting code (ECC) component 116, 126 and an interconnect interface component 118, 128.

Each processing domain 110, 120 is set up to progress from one well-defined state to the next well-defined state. When a new set of inputs reaches the system, each processing domain 110, 120 processes the new set of inputs, updating its current state and generating new outputs. When operating in lockstep mode, the processing domains 110, 120 are arranged to run the same set of operations (i.e. receive and processes the same sets of inputs) in parallel or with a time-shift (delay) between the processing domains which increases the detection probability of faults induced by external influences such as voltage spikes, ionizing radiation, etc. In this manner, the second (redundant) processing domain 120 may provide a redundancy for the first (active) processing domain 110, as well as providing a processing domain state with which to compare and check the validity of the active first processing domain 110.

In the conventional lockstep architecture 100 illustrated in FIG. 1, a supervisor component 140 supervises the operation of the lockstep cores 112, 122 by comparing instruction and data signals between the respective processor cores 112, 122 and the interconnect component 130. For the architecture 100 illustrated in FIG. 1, processor state signals 150, 155 representative of said instruction and data signals are provided by the respective cache memory component 114, 124 and/or ECC component 116, 126.

The supervisor component 140 performs a comparison of the processor state signals 150, 155. Any operational deviations between the processor state signals 150, 155 will cause the supervisor component 140 to initiate fault management. However, because the supervisor component 140 within the conventional lockstep architecture only receives processor state signals 150, 155 representative of instruction and data signals between the respective processor cores 112, 122 (i.e. representative of inputs and outputs of the processor cores 112, 122), the supervisor component 140 is only capable of performing fault detection at the processor core level. Accordingly, any fault management initiated by the supervisor component 140 is also limited to being performed at the processor core level, for example consisting of a full reset/recovery of each entire processor cores 112, 122. Significantly, in a multi-threaded lockstep processing system, such a full reset/recovery of the processor cores 112, 122 effects all threads being executed, including threads not associated with the detected fault.

Figure 2:
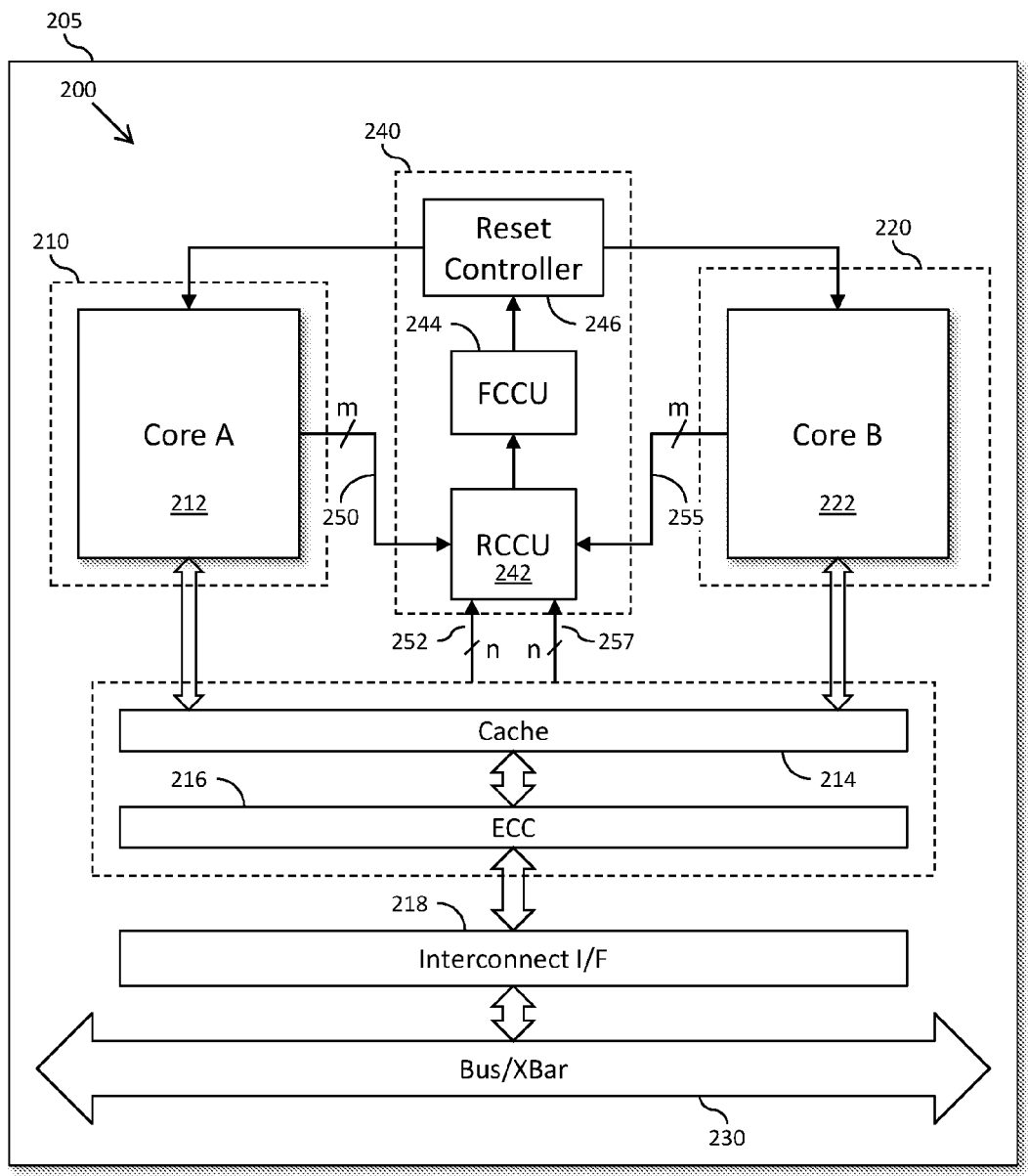
FIG. 2 illustrates a simplified block diagram of a processing system.

Referring now to FIG. 2, there is illustrated a simplified block diagram of a processing system 200 adapted in accordance with some example embodiments of the present invention. In some examples, the processing system 200 comprises a System-on-Chip implemented within an integrated circuit device 205. The processing system 200 consists of a lockstep architecture including of a first processing domain 210 and a second processing domain 220. Each of the processing domains 210, 220 includes one or more processor cores 212, 222 coupled to one or more interconnect components 230 such as a system bus, crossbar switch, or the like. In the illustrated architecture of FIG. 2, the processor cores 212, 222 are coupled to the interconnect component 230 via a cache memory component 214, error correcting code (ECC) component 216 and an interconnect interface component 218. In accordance with some example embodiments, each of the processor cores 212, 222 consists of a multi-threaded processor core capable of executing multiple threads concurrently.

A supervisor component 240 supervises the operation of the processor cores 212, 222 when configured to operate in a lockstep mode by comparing signals representative of internal states of the processing domains 210, 220. For the processing system 200 illustrated in FIG. 2, each processor core 212, 222 is arranged to output to the supervisor component 240 a set of internal state signals 250, 255 representative of the current states of internal components of the processor core 212, 222.

Figure 3:
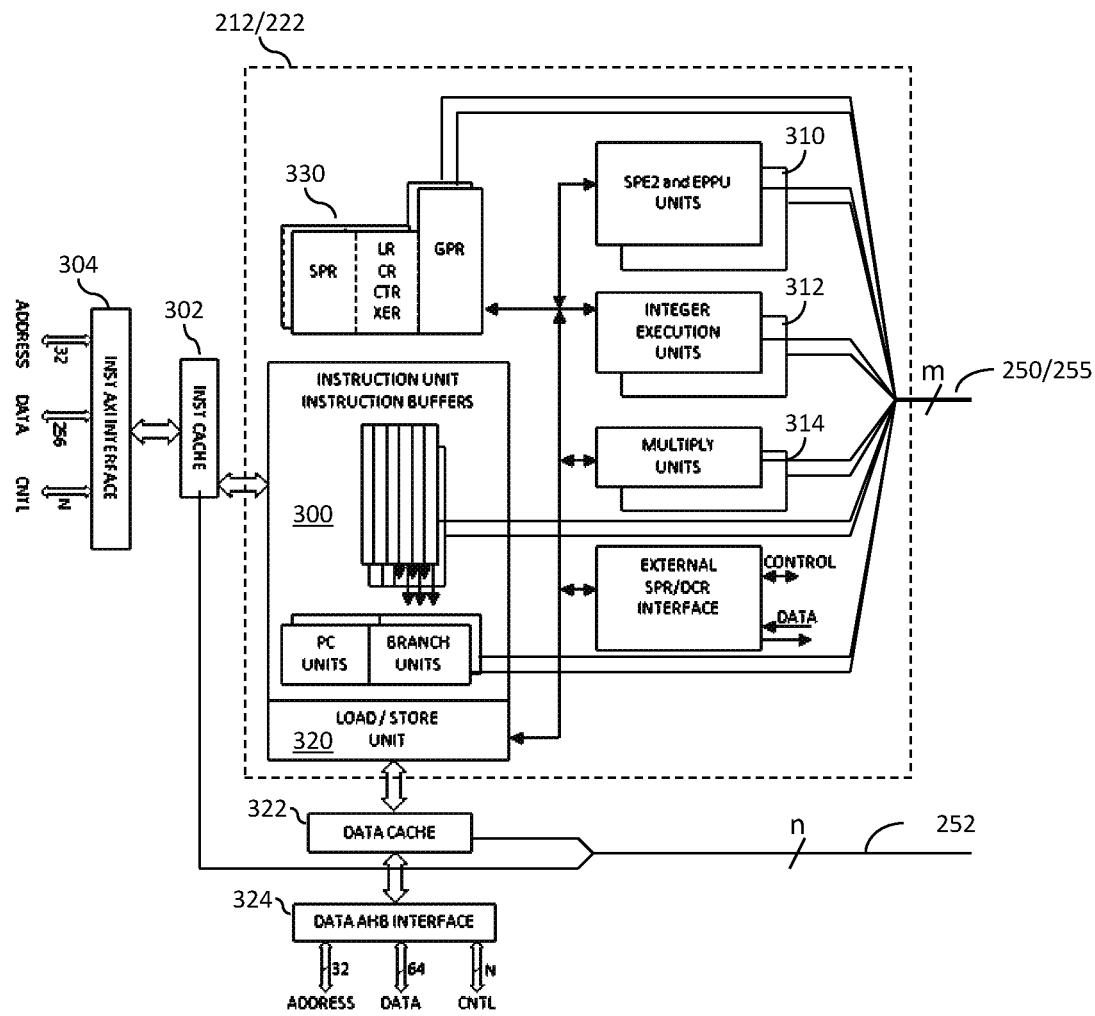
FIG. 3 illustrates a simplified block diagram of an example of a processor cores.

FIG. 3 illustrates a simplified block diagram of an example of one of the processor cores 212, 222. In the simplified example illustrated in FIG. 3, each processor core 212, 222 includes internal components consisting of an instruction unit 300, execution units 310-314, a load/store unit 320 and various registers 330.

The instruction unit 300 illustrated in FIG. 3 includes instruction buffers for queuing instructions to be executed for the various threads running on the processor core 212, 222, along with program counter units for storing program counters for the threads, and branch units for facilitating branch and jump operations within the threads. In addition, the instruction unit 300 is arranged to fetch instructions from memory, for example via an instruction cache component 302 of the cache memory component 214 (FIG. 2) and an instruction interconnect interface component 304 of the interconnect interface component 218 (FIG. 2). The instruction unit 300 is further arranged to decode instructions to be executed, and issue control signals to the various other internal components of the processor core 212, 222 to enable the execution of the decoded instruction.

In the example illustrated in FIG. 3, the execution units include enhanced signal processing and embedded floating-point units 310, integer execution units 312 and multiple units 314. The load/store unit 320 is arranged to perform memory accesses whereby data is read from and written to memory, for example via a data cache component 322 of the cache memory component 214 (FIG. 2) and a data interconnect interface component 324 of the interconnect interface component 218 (FIG. 2). The registers 330 of the processor cores 212, 222 may include, for example, general purpose registers (GFR), special purpose registers (SPR), link registers (LR), condition registers (CR), count registers (CTR), carry/overflow registers (XER), etc.

As described above, each processor core 212, 222 is arranged to output to the supervisor component 240 (FIG. 2) a set of internal state signals 250, 255 representative of the current states of internal components of the processor core 212, 222. In some example embodiments, it is contemplated that such internal state signals 250, 255 are representative of the current states of internal components within a plurality of instruction pipeline stages of the processor cores 212, 222. For example, such internal state signals 250, 255 may include signals representative of the current states internal components within two or more of:

- an instruction fetch stage of the respective processor core 212, 222 (e.g. provided by one or more elements within the instruction unit 300);
- an instruction decode stage of the respective processor core 212, 222 (e.g. provided by one or more elements within the instruction unit 300);
- an execution stage of the respective processor core 212, 222 (e.g. provided by one or more of the execution units 310-314);
- a memory access stage of the respective processor core 212, 222 (e.g. provided by the load/store unit 320); and
- a register write back stage of the respective processor core 212, 222 (e.g. provided by the registers 330).

Referring back to FIG. 2, in the illustrated example, the supervisor component 240 is further arranged to receive and compare processor state signals 252, 257 representative of instruction and data signals between the respective processor cores 212, 222 and the interconnect component 230. In the example illustrated in FIG. 2, such processor state signals 252, 257 representative of said instruction and data signals are provided by the cache memory component 214 and/or ECC component 216.

Upon detection of a mismatch between compared internal state signals, the supervisor component 240 is arranged to initiate a reset of a thread (the 'faulty thread') under the execution of which the detected mismatch of internal state signals occurred.

In some examples, and as described in greater detail below, upon detection of a mismatch between compared internal state signals, the supervisor component 240 is arranged to identify resources within the processing domains 210, 220 responsible for the detected mismatching state signals, determine whether the identified processing domain resources are duplicated resources, and if the identified processing domain resources are duplicated resources, initiate a reset of the faulty thread. In some further examples, if the identified processing domain resources are not duplicated resources, the supervisor component 240 is arranged to initiate a full reset of the processor cores 212, 222.

In some further examples, following a reset of the faulty thread, the processing system 200 may be arranged to perform a self-test of reset resources and the supervisor component 240 may be arranged to determine which of a hard fault and a soft fault was responsible for the detected mismatch between compared internal state signals. If it is determined that a soft fault was responsible for the detected mismatch, the supervisor component 240 may then be arranged to reconfigure the reset thread for continued execution. Conversely, if it is determined that a hard fault was responsible for the detected mismatch, the supervisor component 240 may determine an appropriate action in response to a hard fault. For example, the supervisor component 240 may be arranged to hold the reset (faulty) thread in a reset state, put the processing system 200 as a whole in a safe mode (for example whereby the processing system 200 has limited functionality) or disable the processing system 200.

Referring to the specific example illustrated in FIG. 2, the supervisor component 240 illustrated in FIG. 2 includes a state comparison component, which in the illustrated example is in the form of El Redundancy Control and Checker Unit (RCCU). The RCCU 242 is arranged to receive the internal state signals 250, 255 and processor state signals 252, 257 from each of the processing domains 210, 220, compare state signals 250, 252 from the first processing domain 210 to corresponding state signals 255, 257 from the second processing domain 220. Upon detection of a mismatch between compared state signals, the RCCU 242 is arranged to provide a fault-detected signal to a fault management component, which in the illustrated example is in the form of a Fault Collection and Control Unit (FCCU) 244 indicating that a mismatch between state signals has been detected, including an indication of where within the processing domains the detected fault occurred.

Figure 4:
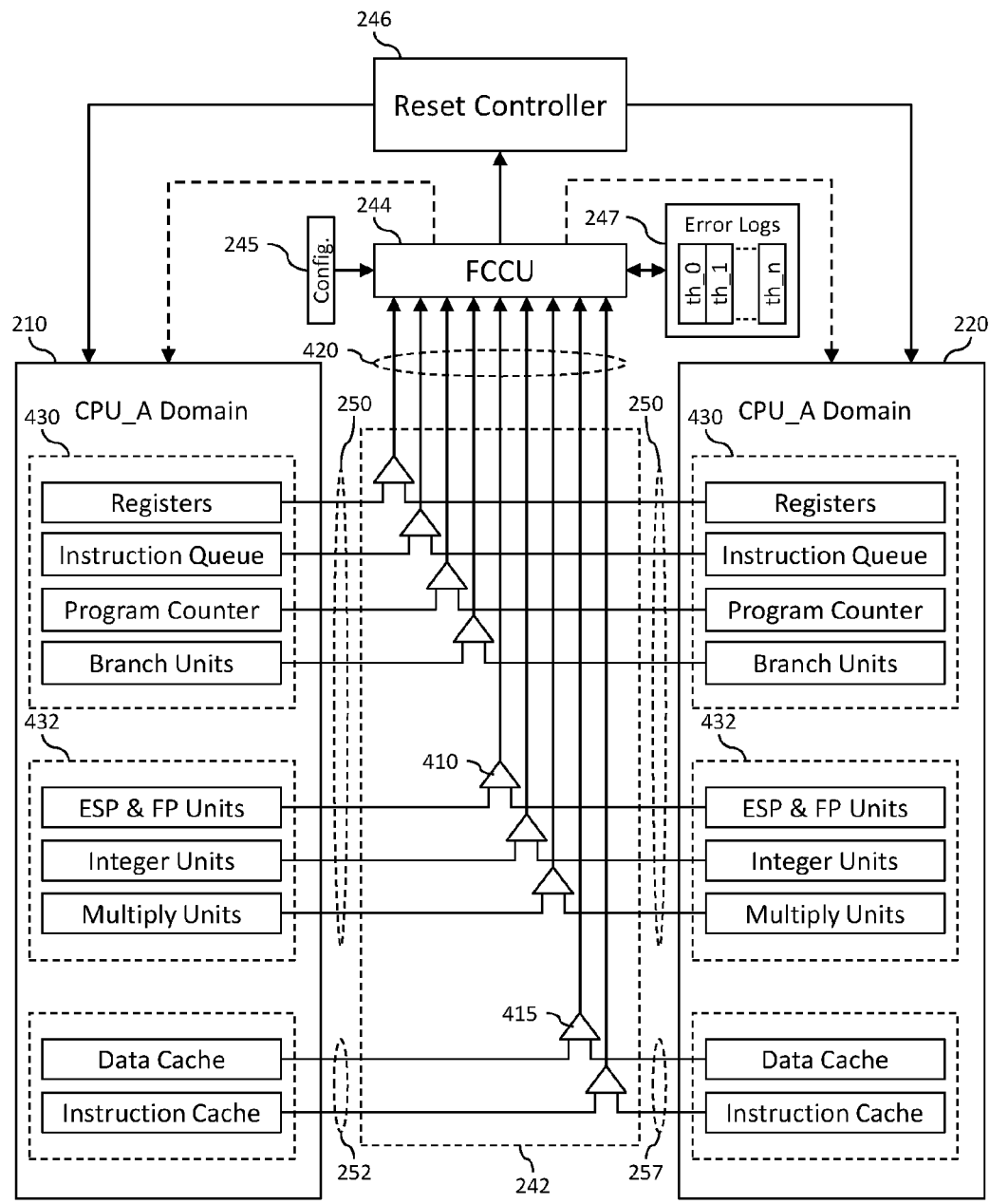
FIG. 4 illustrates a simplified block diagram of an example of a supervisor component.

FIG. 4 illustrates a simplified block diagram of an example of the supervisor component 240. In the example illustrated in FIG. 4, the RCCU 242 consists of a plurality of comparator elements, such as those indicated at 410, 415. Each comparator element 410, 415 is arranged to receive at inputs thereof a pair of corresponding state signals, one from each of the processing domains 210, 220, and to output an indication of whether the received pair of state signals match, and thus whether the respective states within the processing domains 210, 220 match.

In the case where the processing system 200 is arranged to run with a time-shift (delay) between the processing domains 210, 220, for example where the second processing domain 220 is arranged to run with a delay relative to the first processing domain 210, the comparator elements 410, 415 may be arranged to compare corresponding state signals whereby the state signals 250, 252 from the non-delayed first processing domain 210 are delayed prior to being compared to the corresponding state signals 255, 257 from the delayed second processing domain 220. In this manner, the delay between the processing domains 210, 220 is compensated for such that state signals 250, 252, 255, 257 corresponding to matching operations being performed within two processing domains 210, 220 are compared.

In the example illustrated in FIG. 4, the RCCU 242 includes a set of internal state comparator elements, such as the comparator element 410, arranged to receive pairs of corresponding internal state signals 250, 255 and a set of processor state comparator elements, such as the comparator element 415, arranged to receive pairs of corresponding processor state signals 252, 257.

The indications 420 output by the comparator elements 410, 415 are then provided to the FCCU 244. In this manner, upon a state mismatch being detected by a comparator element 410, 415 within the RCCU 242, the FCCU 244 receives the indication from that comparator element 410, 415. Upon receipt of such an indication that a mismatch between compared state signals has been detected, the FCCU 244 may first be arranged to determine whether the supervisor component 240 is configured to perform running recovery of faulty threads, for example based on configuration data 245. If the supervisor component 240 is configured to perform running recovery of faulty threads, the FCCU 244 is arranged to identify resources responsible for the detected mismatching state signals, for example based on the comparator element 410, 415 from which the indication 420 was received. The FCCU 244 is then arranged to determine whether identified resources responsible for the detected mismatching state signals are duplicated resources, i.e. that alternative versions of such resources are available to other threads running on the processor cores 212, 222.

For example, and as illustrated in FIG. 4, each processing domain 210, 220 may include private duplicate resources 430, whereby each thread has its own private version of such resources. Such private duplicate resources 430 may include, for example, registers, instructions queues, program counters, branch units, etc. Each processing domain 210, 220 may further include shared duplicate resources 432, whereby multiple versions of a resource are shared by all threads. Such shared duplicate resources 432 may include, for example, the execution units 310-314 within each processor core 212, 222. Non-duplicate resources within each processing domain 210, 220 may include, for example, the instruction and data cache components 302, 322 etc.

If it is determined that the identified resources responsible for the detected mismatching state signals are duplicate resources, the FCCU 244 is arranged to initiate a reset of the faulty thread. In the illustrated example, the FCCU 244 is arranged to initiate a reset of a thread by signalling to a reset controller component 246. Conversely, if it is determined that the identified resources responsible for the detected mismatching state signals are not duplicate resources, the FCCU 244 may be arranged to initiate a full reset of the processor cores 212, 222, for example by signalling to the reset controller component 246.

Upon receipt of a signal to reset a faulty thread, the reset controller component 246 is arranged to trigger the resetting of the faulty thread within each of the processor cores 212, 222, for example by resetting the private duplicated resources for the respective thread. Following such a reset of the faulty thread, the processing system 200 may be arranged to perform a self-test of the reset resources. Following such a self-test of the reset resources, the reset controller component 246 is arranged to determine whether the detected mismatch between compared state signals that triggered the reset was caused by a soft or hard fault. If it is determined that the mismatch between state signals was caused by a soft fault, the reset controller component 246 is arranged to reconfigure the reset thread for execution by the processor cores 212, 222, for example by reconfiguring the private duplicated resources 430 for the reset thread. Conversely, if it is determined that a hard fault was responsible for the detected mismatch, the reset controller component 246 may determine an appropriate action in response to a hard fault, for example based on the configuration data 245. For example, the reset controller component 246 may be arranged to hold the reset (faulty) thread in a reset state, put the processing system 200 as a whole in a safe mode (for example whereby the processing system 200 has limited functionality) or disable the processing system 200.

In some examples, the FCCU 244 may be arranged to track recurring soft errors in a thread, for example by recording error information as illustrated generally at 247. Such error information may contain, for example, the last thread which had an error and in which unit/comparator the error was detected.

Figure 5:
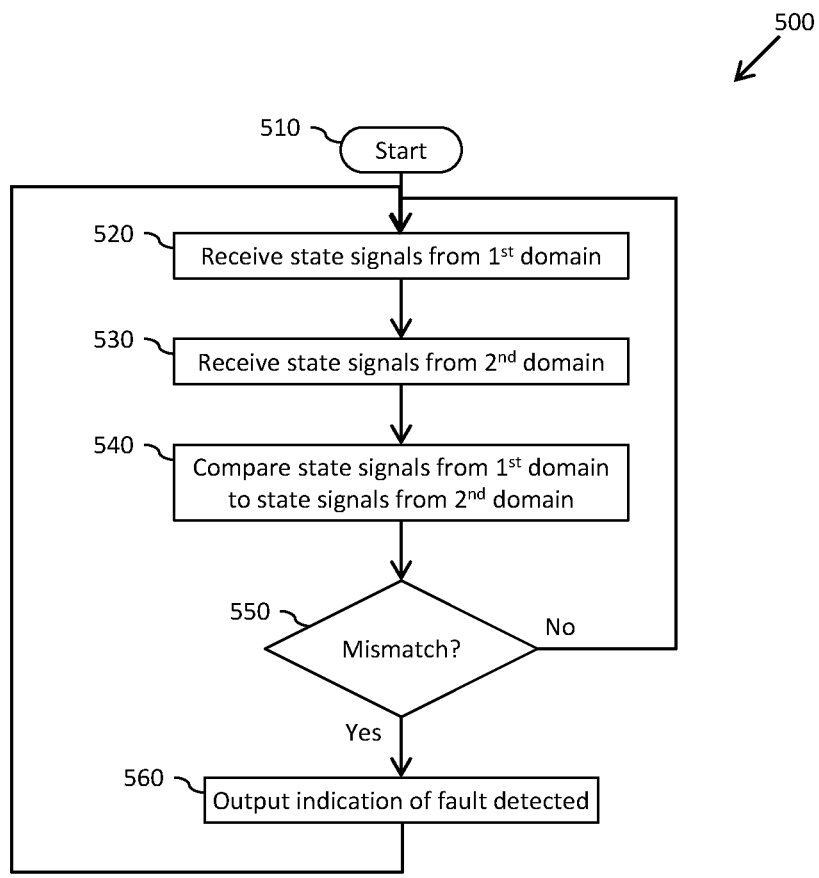
FIGS. 5 to 7 illustrate simplified flowcharts of an example of a method of managing mismatches within a multi-threaded lockstep processing system.
Figure 6:
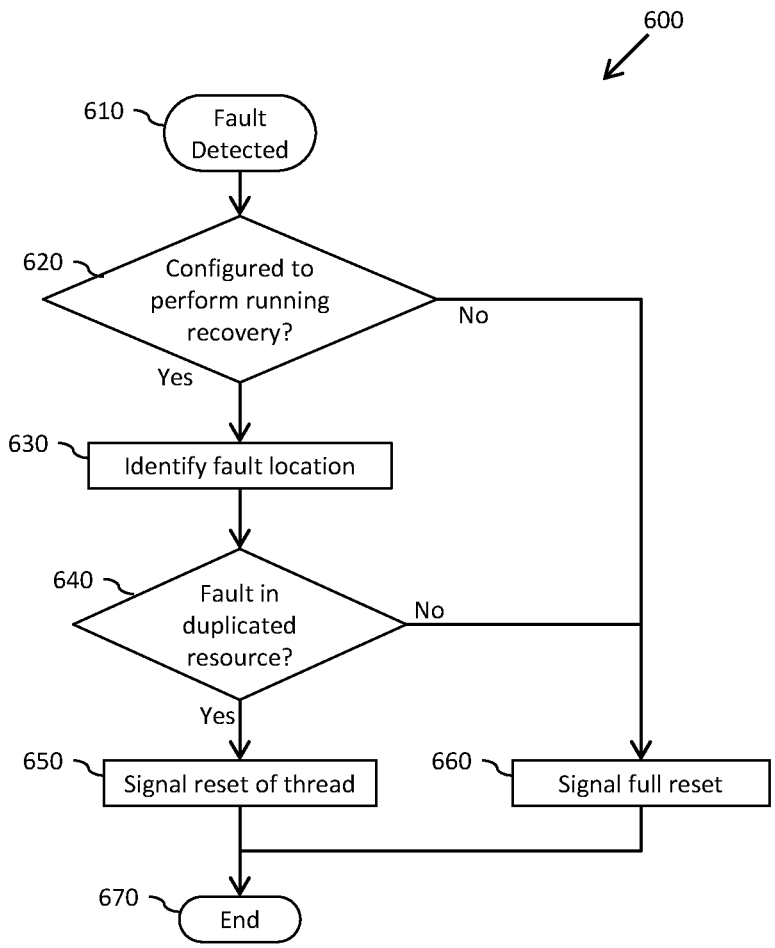
Figure 7:
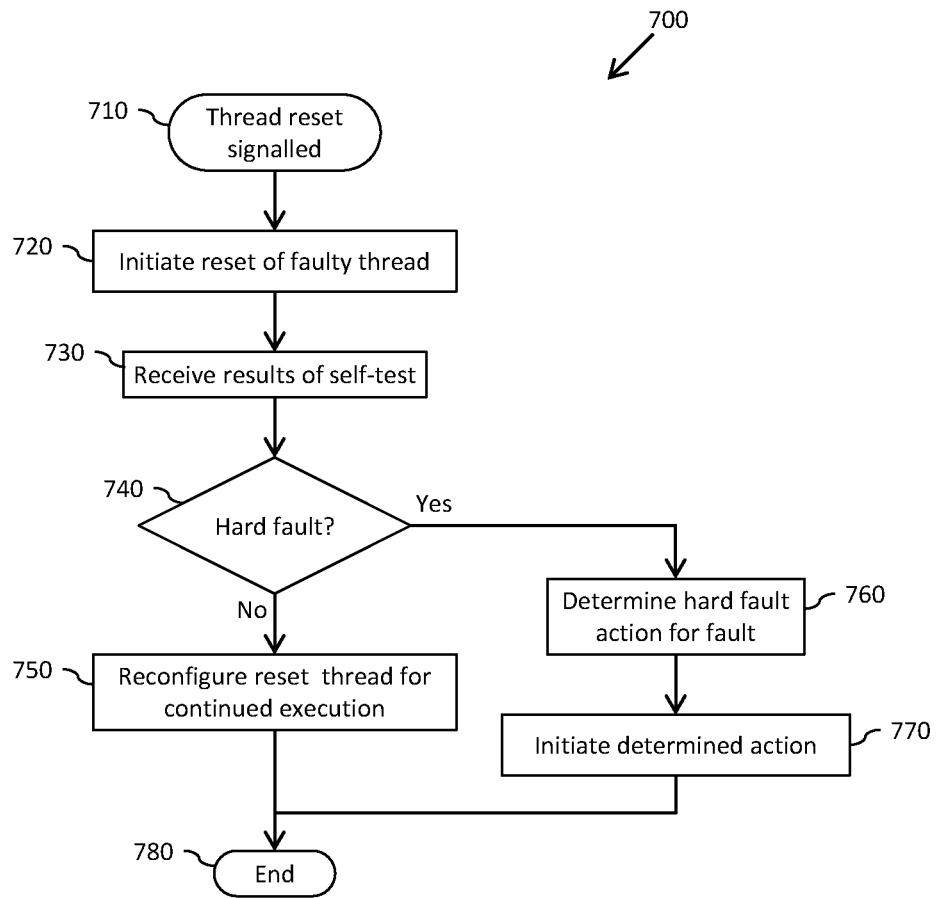

Referring now to FIGS. 5 to 7, there are illustrated simplified flowcharts 500, 600 of an example of a method of managing mismatches within a multi-threaded lockstep processing system, such as may be implemented within the processing system 200 of FIGS. 2 to 4. A first part of the method, such as may be implemented within the RCCU 242 of FIGS. 2 and 4, starts at 510 and moves on to 520 where a set of state signals 250, 252, including a set of internal processor state signals 250, output by the first processing domain 210 are received. A set of state signals 255, 257, including a set of internal processor state signals 255, output by the second processing domain 220 are received, at 530. The state signals 250, 252 output by the first processing domain 210 are compared to corresponding state signals 255, 257 output by the second processing domain 220, at 540. If no mismatch is detected between a pair of corresponding state signals at 550, the method loops back to 520. Conversely, if a mismatch between a pair of corresponding state signals is detected, at 550, the method moves on to 560 where, in the example illustrated in FIG. 5, an indication of a detected fault is output. The method then loops back to 520.

Referring now to FIG. 6, a further part of the method, such as may be implemented within the FCCU 244 of FIGS. 2 and 4, starts at 610 upon detection of a fault, for example upon an indication of a detected fault being output at step 560 of FIG. 5, such as the RCCU 242. The method then moves on to 620 where it is determined whether the system 200 is configured to perform a running recovery. If it is determined that the system 200 is not configured to perform a running recovery, the method moves on to 660 where a full reset of the processor cores 212, 222 is signalled. However, if it is determined that the system 200 is configured to perform a running recovery, the method moves on to 630 where processing resources within the processing domains 210, 220 responsible for the detected mismatching state signals are identified, thereby identifying the location of the respective fault within the processing domains 210, 220. Having identified the location of the fault, the method moves on to 640 wherein it is determined whether the processing resources responsible for the detected mismatching state signals consist of duplicated resources of the respective processing domain 210, 220, such as private duplicate resources 410 or shared private resources 420 illustrated in FIG. 4. In the example illustrated in FIG. 6, if it is determined that the processing resources responsible for the detected mismatching state signals do consist of duplicated resources, the method moves on to 650 where for the illustrated example a reset of the thread running on the processor cores 212, 222 under the execution of which the detected mismatch occurred is signalled. Conversely, if it is determined that the processing resources responsible for the detected mismatching state signals do not consist of duplicated resources, the method moves on to 660 where for the illustrated example a full reset of the processor cores 212, 222 is signalled. In this manner, upon detection of a mismatch between state signals compared at 540, and in particular upon a mismatch between state signals for duplicated resources, a reset of the individual thread under the execution of which the detected mismatch occurred may be initiated. This part of the method then ends, at 670.

Referring now to FIG. 7, a further part of the method, such as may be implemented within the reset controller component 246 of FIGS. 2 and 4, starts at 710 upon a thread reset being signalled, such as at step 650 of FIG. 6 by the FCCU 244. The method then moves on to 720 where a reset of the signalled (faulty) thread is initiated, for example, by way of an individually routed set of reset signals which would enable a subset of the components of the system 200 to be reset and isolated from the rest of the system 200 during that reset, with the ability to resynchronize the reset subset of components upon recovery from the reset.

Having initiated the reset of the signalled thread, the method moves on to 730 where results of a recovery test performed following the reset of the signalled thread are received. Such a recovery test may be implemented by hardware built-in self-test components of the processing domains 210, 220 or by way of software executed on the processor cores 212, 222, and in some examples enables hard and soft faults within reset components of the processing domains 210, 220 to be differentiated. For example, a counter may be used to detect recurring resets caused by hard faults. If it is determined that a hard fault has occurred, at 740, the method moves on to 760 where the appropriate (e.g. configured) action for the detected hard fault is determined. For example, the reset controller component 246 may be configured to hold the reset (faulty) thread in a reset state, put the processing system 200 as a whole in a safe mode (for example whereby the processing system 200 has limited functionality) or disable the processing system 200. In some examples, different hard fault actions may be configured for different processing resources, and the action determined at 760 may depend on the location of the hard fault within the processing domains 210, 220. Having determined the appropriate action at 760, the determined action is implemented, at 770, and the method ends at 780. Referring back to 740, if it is determined that the fault responsible for the thread reset is a soft fault, the method moves on to 750 where the reset thread is reconfigured for continued execution (for example registers etc. for the thread re-configured to put the thread into a default/initial state or a last known correct state), and the method ends at 780.

In this manner, a running recovery of the faulty thread may be achieved, without having to perform a full reset of the processor cores 212, 222 and thus without other (non-faulty) threads running concurrently on the processing cores 212, 222 being reset or stopped. In some examples, it is contemplated that upon initialing a (running recovery) reset of a faulty thread, as hereinbefore described, other (non-faulty) threads running concurrently on the processing cores 212, 222 may be notified of a faulty thread being reset, thereby enabling the operation of the non-faulty threads to be adapted accordingly in case the temporary unavailability of the faulty thread impacts on the functionality of the non-faulty threads.

Thus, example embodiments of a method and apparatus for managing mismatches within a multi-threaded lockstep processing system have been described that provide an ability to check between lockstep processor cores 212-222 and maintain the execution of non-failing threads when a fault is detected in a failing thread. In particular, in some example embodiments, there is provided an ability to check within the instruction pipelines of the processor cores 212, 222 to identify which processing resources of the processor cores 212, 222 have 'failed', and enables the system 200 to continue with higher levels of availability whilst recovering from a detected fault within a failing thread, as compared with conventional systems that require a full system reset.

Parts of the invention may be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system.

The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a tangible and non-transitory computer readable storage medium or transmitted to the computer system via a computer readable transmission medium. All or some of the computer program may be provided on computer readable media permanently, removably or remotely coupled to an information processing system. The tangible and non-transitory computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above.

Furthermore, because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms 'assert' or 'set' and 'negate' (or 'de-assert' or 'clear') are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, in the illustrated example, the functionality of the supervisor component 240 has been illustrated and described as being distributed within the RCCU 242, FCCU 244 and reset controller component 246. However, it is contemplated that the functionality herein described may be distributed across any number of functional components and in any suitable manner, and is not limited to the illustrated and described examples.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A processing system comprising a first processing domain and a second processing domain; each of the first processing domain and the second processing domain comprises a multi-threaded processor core arranged to output a set of internal state signals representative of current states of internal components of the respective processor core;
    the processing system further comprises a supervisor component arranged to receive the sets of internal state signals output by the processor cores of the first and second processing domains, compare internal state signals output by the processor core of the first processing domain to corresponding internal state signals output by the processor core of the second processing domain, and upon detection of a mismatch between compared internal state signals to initiate a reset of a thread under the execution of which the detected mismatch of internal state signals occurred,
    wherein following a reset of the thread under the execution of which the detected mismatch of internal state signals occurred, the processing system is arranged to perform a self-test and the supervisor component is arranged to determine which of a hard fault and a soft fault was responsible for the detected mismatch between compared internal state signals, and if it is determined that a soft fault was responsible for the detected mismatch, the supervisor component is arranged to reconfigure the reset thread for continued execution.

2. The processing system of claim 1, wherein the set of internal state signals output by the processor core of each of the first and second processing domains comprises signals representative of the current states of internal components within a plurality of instruction pipeline stages of the respective processor core.

3. The processing system of claim 1, wherein the set of internal state signals output by the processor core of each of the first and second processing domains comprises signals representative of the current states of internal components within at least two of:
    an instruction fetch stage of the instruction pipeline of the respective processor core;
    an instruction decode stage of the instruction pipeline of the respective processor core;
    an execution stage of the instruction pipeline of the respective processor core;
    a memory access stage of the instruction pipeline of the respective processor core; and
    a register write back stage of the instruction pipeline of the respective processor core.

4. The processing system of claim 1, wherein upon detection of a mismatch between compared internal state signals, the supervisor component is arranged to:
    identify processor domain resources responsible for the detected mismatching internal state signals;
    determine whether the identified processor domain resources are duplicated resources; and
    if the identified processing domain resources are duplicated resources, initiate a reset of the thread under the execution of which the detected mismatch of internal state signals occurred.

5. The processing system of claim 4, wherein if the identified processing domain resources are not duplicated resources, the supervisor component is arranged to initiate a full reset of the processor cores.

6. The processing system of claim 1, wherein if it is determined that a hard fault was responsible for the detected mismatch, the supervisor component is arranged to perform at least one of:
    holding the reset thread in a reset state;
    putting the processing system into a safe mode; and
    disabling the processing system.

7. An integrated circuit device comprising a processing system;
    the processing system comprises a first processing domain and a second processing domain; each of the first processing domain and the second processing domain comprises a multi-threaded processor core arranged to output a set of internal state signals representative of current states of internal components of the respective processor core;
    the processing system further comprises a supervisor component arranged to receive the sets of internal state signals output by the processor cores of the first and second processing domains, compare internal state signals output by the processor core of the first processing domain to corresponding internal state signals output by the processor core of the second processing domain, and upon detection of a mismatch between compared internal state signals to initiate a reset of a thread under the execution of which the detected mismatch of internal state signals occurred, wherein following a reset of the thread under the execution of which the detected mismatch of internal state signals occurred, the processing system is arranged to perform a self-test and the supervisor component is arranged to determine which of a hard fault and a soft fault was responsible for the detected mismatch between compared internal state signals, and if it is determined that a soft fault was responsible for the detected mismatch, the supervisor component is arranged to reconfigure the reset thread for continued execution.

8. The integrated circuit device of claim 7, wherein the set of internal state signals output by the processor core of each of the first and second processing domains comprises signals representative of the current states of internal components within a plurality of instruction pipeline stages of the respective processor core.

9. The integrated circuit device of claim 7, wherein the set of internal state signals output by the processor core of each of the first and second processing domains comprises signals representative of the current states of internal components within at least two of:
   an instruction fetch stage of the instruction pipeline of the respective processor core;
   an instruction decode stage of the instruction pipeline of the respective processor core;
   an execution stage of the instruction pipeline of the respective processor core;
   a memory access stage of the instruction pipeline of the respective processor core; and
   a register write back stage of the instruction pipeline of the respective processor core.

10. The integrated circuit device of claim 7, wherein upon detection of a mismatch between compared internal state signals, the supervisor component is arranged to:
   identify processor domain resources responsible for the detected mismatching internal state signals;
   determine whether the identified processor domain resources are duplicated resources; and
   if the identified processing domain resources are duplicated resources, initiate a reset of the thread under the execution of which the detected mismatch of internal state signals occurred.

11. The integrated circuit device of claim 10, wherein if the identified processing domain resources are not duplicated resources, the supervisor component is arranged to initiate a full reset of the processor cores.

12. The integrated circuit device of claim 7, wherein if it is determined that a hard fault was responsible for the detected mismatch, the supervisor component is arranged to perform at least one of:
   holding the reset thread in a reset state;
   putting the processing system into a safe mode; and
   disabling the processing system.

13. A method of managing mismatches within a multi-threaded lockstep processing system; the method comprising:
   receiving a set of internal state signals output by a processor core of a first processing domain of a processing system and a corresponding set of internal state signals output by a processor core of a second processing domain of the processing system;
   comparing internal state signals output by the processor core of the first processing domain to corresponding internal state signals output by the processor core of the second processing domain; and
   upon detection of a mismatch between compared internal state signals,
      initiating a reset of a thread running on the processor cores under the execution of which the detected mismatch of internal state signals occurred;
      identifying processor domain resources responsible for the detected mismatching internal state signals;
      determining whether the identified processor domain resources are duplicated resources;
      if the identified processing domain resources are duplicated resources, initiating a reset of the thread under the execution of which the detected mismatch of internal state signals occurred; and
      if the identified processing domain resources are not duplicated resources, initiating a full reset of the processor cores.

14. The method of claim 13, wherein the set of internal state signals output by the processor core of each of the first and second processing domains comprises signals representative of the current states of internal components within a plurality of instruction pipeline stages of the respective processor core.

15. The method of claim 13, wherein the set of internal state signals output by the processor core of each of the first and second processing domains comprises signals representative of the current states of internal components within at least two of:
   an instruction fetch stage of the instruction pipeline of the respective processor core;
   an instruction decode stage of the instruction pipeline of the respective processor core;
   an execution stage of the instruction pipeline of the respective processor core;
   a memory access stage of the instruction pipeline of the respective processor core; and
   a register write back stage of the instruction pipeline of the respective processor core.

16. The method of claim 13, wherein following a reset of the thread under the execution of which the detected mismatch of internal state signals occurred, the method further comprises:
   determining which of a hard fault and a soft fault was responsible for the detected mismatch between compared internal state signals; and
   if it is determined that a soft fault was responsible for the detected mismatch, reconfiguring the reset thread for continued execution.

* * * * *